(12) United States Patent
Richter et al.

(10) Patent No.: US 9,017,220 B2
(45) Date of Patent: Apr. 28, 2015

(54) METHOD FOR OPERATING A BRAKE SYSTEM OF A WORK MACHINE AND BRAKE SYSTEM FOR A WORK MACHINE

(75) Inventors: Alfred Richter, Eisenach (DE); Frederic Lastre, Thionville (FR)

(73) Assignee: Volvo Construction Equipment AB, Eskilstuna (SE)

( * ) Notice: Subject to any disclaimer, the term of this patent is extended or adjusted under 35 U.S.C. 154(b) by 1065 days.

(21) Appl. No.: 13/062,719

(22) PCT Filed: Sep. 8, 2008

(86) PCT No.: PCT/SE2008/000503
§ 371 (c)(1),
(2), (4) Date: Aug. 24, 2011

(87) PCT Pub. No.: WO2010/027302
PCT Pub. Date: Mar. 11, 2010

(65) Prior Publication Data
US 2011/0300992 A1  Dec. 8, 2011

(51) Int. Cl.
*G06F 7/70* (2006.01)
*B60T 13/68* (2006.01)
*B60T 7/12* (2006.01)

(52) U.S. Cl.
CPC ............ *B60T 13/686* (2013.01); *Y10T 477/813* (2015.01); *Y10T 477/816* (2015.01); *B60K 2741/205* (2013.01); *B60T 7/12* (2013.01)

(58) Field of Classification Search
CPC .... B60T 7/12; B60T 13/686; B60K 2741/205
See application file for complete search history.

(56) References Cited

U.S. PATENT DOCUMENTS

| 4,652,059 | A | 3/1987 | Wittich |
| 4,969,103 | A | 11/1990 | Maekawa |
| 6,554,744 | B2 * | 4/2003 | Schmidt ........................ 477/208 |

FOREIGN PATENT DOCUMENTS

| EP | 0589253 A1 | 3/1994 |
| EP | 0989039 | 4/1999 |
| EP | 1767421 A1 | 3/2007 |
| JP | 7186914 A | 7/1995 |
| KR | 10-1998-0022374 | 7/1998 |
| WO | 0051860 | 9/2000 |
| WO | 2006046273 A1 | 5/2006 |

OTHER PUBLICATIONS

International Search Report for corresponding International Application PCT/SE2008/000503.
International Preliminary Report on Patentability for corresponding International Application PCT/SE2008/000503.
Korean Official Action (Aug. 22, 2014) (translation) for corresponding Korean Application 9-5-2014-057391567.

* cited by examiner

*Primary Examiner* — Derek D Knight
(74) *Attorney, Agent, or Firm* — WRB-IP LLP

(57) ABSTRACT

A method for operating a brake system for a work machine that includes at least one operating brake acting directly or indirectly on at least one ground engagement element of the work machine and at least one operating brake actuator which is movable between a fully engaged position and a fully released position and an accelerator actuator for activating propulsion of the work machine. In an activated state of the brake system the operating brake actuator is moved automatically to its fully engaged position when the accelerator actuator is released.

18 Claims, 3 Drawing Sheets

METHOD FOR OPERATING A BRAKE SYSTEM OF A WORK MACHINE AND BRAKE SYSTEM FOR A WORK MACHINE

BACKGROUND AND SUMMARY

The invention relates to a method for operating a brake system of a work machine and a brake system for a work machine.

Work machines, also called construction equipment or construction vehicles, as for instance excavators or wheel loaders are vehicles designed for and used in rough off-road surroundings where trucks or passenger cars are inoperative or, if operated in such surroundings, would probably be damaged when exposed to these rough conditions.

Work machines such as e.g. a wheel excavator, employ parking brakes as well as operating brakes, e.g. a digging brake, which are activated when the work machine is stopped for working operation, e.g. for digging. The parking brakes are activated when the vehicle is stopped in a situation where there is no working operation performed. In conventional work machines, the operating brake pedal has to be pressed down to its fully engaged position in order to engage the operating brakes. To disengage the operating brakes, the operating brake pedal has to be released from its fully engaged position. To release the operating brake pedal, the pedal has to be pressed further down than the fully engaged position with high force before the pedal is released.

EP 0 989 039 B1 discloses a mobile excavator with wheel drive with a braking arrangement comprising operating and parking brakes on each wheel. The operating brakes are actuated by an automatic brake system employing a hydraulic system which comprises a valve controlled by a control unit. The valve activates the brakes independently from an activation of the brake pedal when the automatic brake system is active. For instance, the operating brakes can be activated if the velocity of the work machine is zero and the accelerator pedal is not pressed. The automatic brake system can be turned on or off using an actuator. Inputs are taken which represent the driver intentions, e.g. the position of the brake or accelerator pedal. Outputs are provided for simultaneous operation of the operation brakes and the parking brakes and a blocking device of the pivot axle. The brake system is only operative if the hydraulic pump of the hydraulic system is running.

EP1767421 A1 discloses a brake system where a driver depresses a brake pedal for locking a hydraulic brake device. The brake pedal stays depressed. For releasing the brake pedal, the driver has to depress the brake pedal further to its maximum extend. This requires a high force and is not comfortable for the driver, particularly if during operation of the work machine the operator has to depress and release the brake pedal frequently. During operation of the work machine, the operator has to work both with the brake pedal and the accelerator.

It is desirable to provide a brake system for a work machine, particularly a wheel excavator, which allows for a comfortable and safe operation of the operating brakes. It is also desirable to provide a method for operating a brake system.

According to a first aspect of the invention, a method for operating a brake system for a work machine is proposed, comprising at least one operating brake acting directly or indirectly on at least one ground engagement element of the work machine and at least one operating brake actuator and an accelerator actuator for activating propulsion of the work machine. The operating brake actuator is movable between a fully engaged position and a fully released position. In an activated state of the brake system the operating brake actuator is automatically moved to its fully engaged position when the accelerator actuator is released. Particularly, the at least one operating brake can be engaged and released by hydraulic pressure in a hydraulic circuit which is controllable by a vehicle electronic control unit. More particularly, the operating brake actuator can be mechanically connected to at least one hydraulic cylinder and automatically moved by the piston of the hydraulic cylinder instead of being moved by action of the operator.

According to a further aspect of the invention, a brake system for a work machine is proposed, comprising at least one operating brake acting directly or indirectly on at least one ground engagement element of the work machine and an operating brake actuator which is movable between a fully engaged position and a fully released position and an accelerator actuator for activating propulsion of the work machine. In an activated state of the brake system the operating brake actuator is moved automatically to its fully engaged position when the accelerator actuator is released. In the activated state of the brake system the at least one operating brake is engaged and released by hydraulic pressure in a hydraulic circuit which is controllable by a vehicle electronic control unit.

The operating brake actuator is in the automatic operating brake mode no longer working as an actuator when the operating brakes are actuated automatically but only as an indicator that they have been brought automatically into their engaged position since the system will operate the operating brakes in this mode automatically. According to an advantageous embodiment, the operating brake actuator can operate or can be in operational connection with the operating brakes by activating them in its engaged position and releasing them in its released position.

Favourably, the operator's comfort is improved because an automatic operating brake mode is provided without the operator's interaction which automatically brings the operating brake actuator in its fully engaged position when the accelerator actuator is released and which also automatically releases the operating brake actuator when the accelerator actuator is engaged. For instance, the operator can chose among various modes, such as a working mode, a customer mode, a parking mode, a travelling mode and the like. The working mode and the customer mode can favourably include the automatic operating brake mode. When the respective mode is chosen, e.g. working or customer mode or the like, the automatic operating brake mode can be activated by an actuator, e.g. a switch of a push button or the like. The automatic operating brake mode can be chosen for e.g. performing an operation like digging, which requires securely blocked ground engagement elements, particularly on sloping terrain. The ground engagement elements can be wheels, caterpillar tracks and the like. Preferably, in the automatic operating brake mode the operating brake can be activated as soon as the accelerator actuator is released and the work machine is standing still.

Besides improving the operator's comfort when using the work machine, the status of the operating brake can easily be visualized by the geometrical position of the operating brake actuator. The operator always knows by the actual position of the operating brake actuator if the brake is engaged or not.

The operating brake actuator can be a pedal, a lever, a sliding element or the like. Likewise, the accelerator actuator can be a pedal, a lever, a sliding element of the like. Advantageously, by automatically moving the operating brake actuator in its fully engaged position when the operating brake and the automatic operating brake mode are active, the operator can visually see the state of the operating brake. Thus, the operator can use the work machine alternatively with or without the automatic operating brake mode. In both cases the operating brake actuator is in the same position when the operating brake is engaged. For instance, if the operating brake actuator is a pedal, the pedal is always in a depressed position when the operating brake is engaged.

According to a favourable embodiment of the invention, in the activated state of the brake system the at least one operating brake actuator can be moved automatically to its fully engaged position only if the work machine is not moving or moving with a speed below a predefined speed threshold. Preferably the operating brake actuator can be automatically moved to its engaged position by action of an actuator device. In this case, the vehicle can have a certain "residual" speed of e.g. 1-5 km/h when the operating brake actuator is already allowed to be activated, thereby bringing the machine even faster to a stand still by braking it with the now active operating brakes.

According to a favourable embodiment of the invention, an actuator device, preferably a valve device, can have at least a first operational state and a second operational state. The first operational state corresponds to an engaged position of the accelerator actuator in which the accelerator actuator is engaged. The second operational state corresponds to a released position of the accelerator actuator in which the accelerator actuator is not engaged. In the second operational state of the actuator device, the at least one operating brake can be connectable by the actuator device, preferably valve device, to a high hydraulic pressure which activates the at least one operating brake in order to block the at least one ground engagement element of the work machine in case the at least one operating brake (106L, 106R, 108L, 108R) is connected by the actuator device (30), preferably valve device, to the hydraulic pressure activating said at least one operating brake. Depending on the actual operational state of the accelerator actuator the operating brake can automatically be engaged or released without an action of the operator, except engaging or releasing the accelerator actuator by the operator. Preferably, the actuator device can move the operating brake actuator to its fully engaged position when the device is in its second operational state, without interaction of the operator.

According to a further embodiment of the invention, an element can be provided to move the operating brake actuator back to its fully released position if the actuator device, preferably valve device, is in its first operational state. The element can be e.g. an expansion spring which pushes the operating brake actuator back into its released position when the at least one operating brake is released from the at least one ground engagement element.

Favourably, the actuator device, preferably valve device, in its first operational state can connect the at least one operating brake to a low hydraulic pressure below the high hydraulic pressure activating the at least one operating brake. In a work machine such as a wheel excavator, the low hydraulic pressure level is in the range of not more than a few bar. For instance, in one example the hydraulic pressure at the accelerator actuator can be as low as 2 bar or even less when the accelerator actuator, e.g. an accelerator pedal, is not engaged, i.e. when the actuator device, preferably valve device, is in its second operational state. In this case, the operating brake is subject to a high hydraulic pressure and the operating brake actuator is automatically moved to its fully engaged position. The hydraulic pressure (operating pressure) which activates the at least one operating brake can be several tens of bar, e.g. 65 bar or more.

Preferably, in the first operational state of the actuator device, preferably valve device, the accelerator actuator is in its engaged position, the operating brake actuator is in its released position and the at least one operating brake is connected to a low hydraulic pressure and in its released position. In the second operational state of the actuator device, preferably valve device, the accelerator actuator is in its released position, the operating brake actuator is in its engaged position and the at least one operating brake is connected to a high hydraulic pressure and in its engaged position.

The operating brake actuator can be mechanically or electromechanically or hydraulically locked in its fully engaged position and that said locking preferably can be achieved by a retractable latch which locks the operating brake actuator in the fully engaged position. The operator can still use the work machine without the automatic operating brake mode as it is possible to use a lock for securely fastening the operating brake actuator.

Advantageously, an actuator can be provided for selecting one or more modes of the work machine, wherein at least one mode includes the automatic operating brake mode which activates the at least one operating brake of the brake system.

Preferably a display is provided which indicates the selected mode and/or the status of the automatic operating brake mode. Additionally, information about failure or status of the automatic operating brake mode can be displayed on the display.

BRIEF DESCRIPTION OF THE DRAWINGS

The present invention-may best be understood from the following detailed description of the embodiments, but not restricted to the embodiments, wherein is shown.

DETAILED DESCRIPTION

Figure 1A:
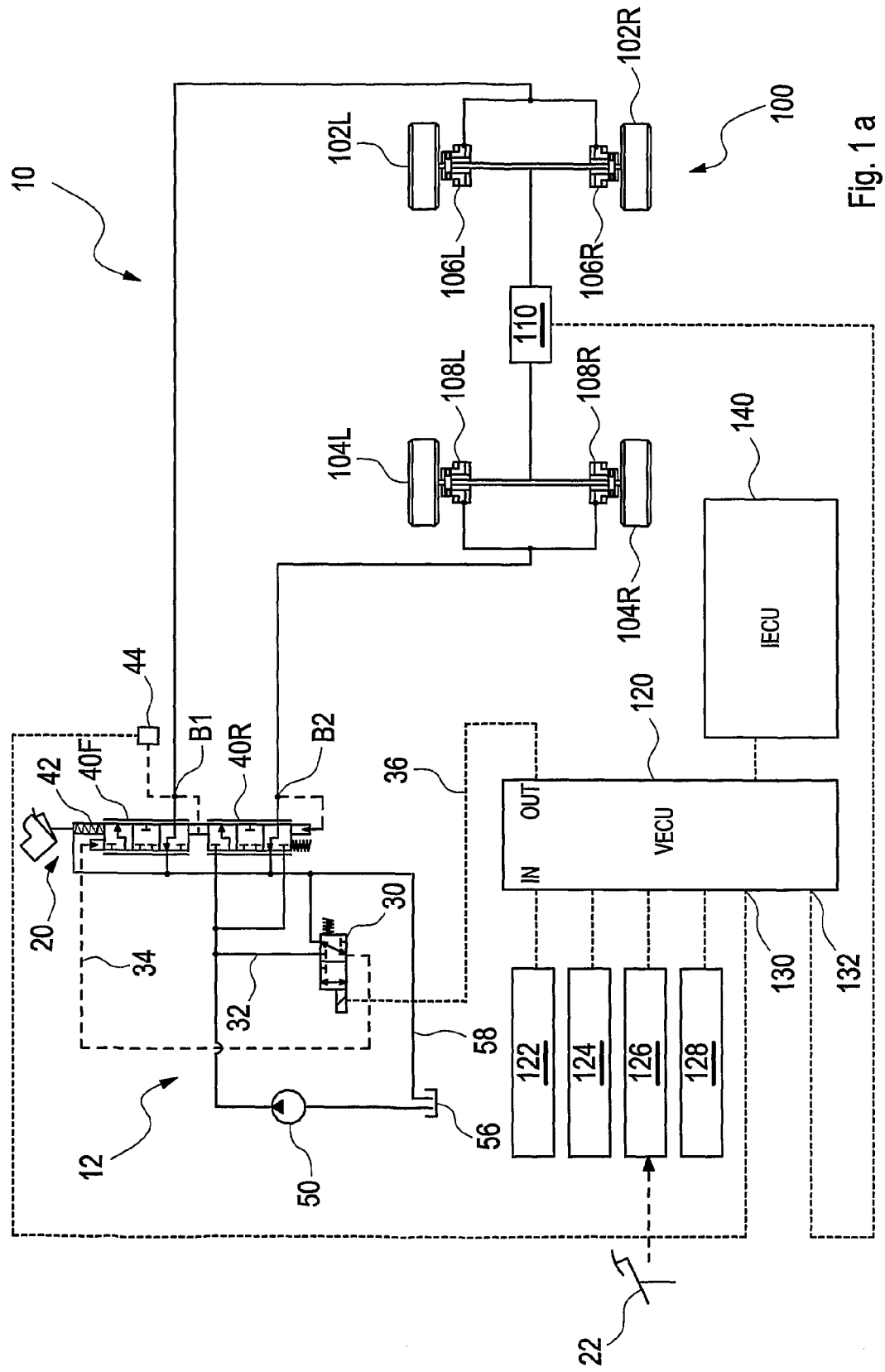
FIG. 1a, b a hydraulic circuit for an operating brake according to a preferred embodiment of the invention with the operating brake in a deenergized position (FIG. 1a) and in an energized position (FIG. 1b)

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

Figure 1B:
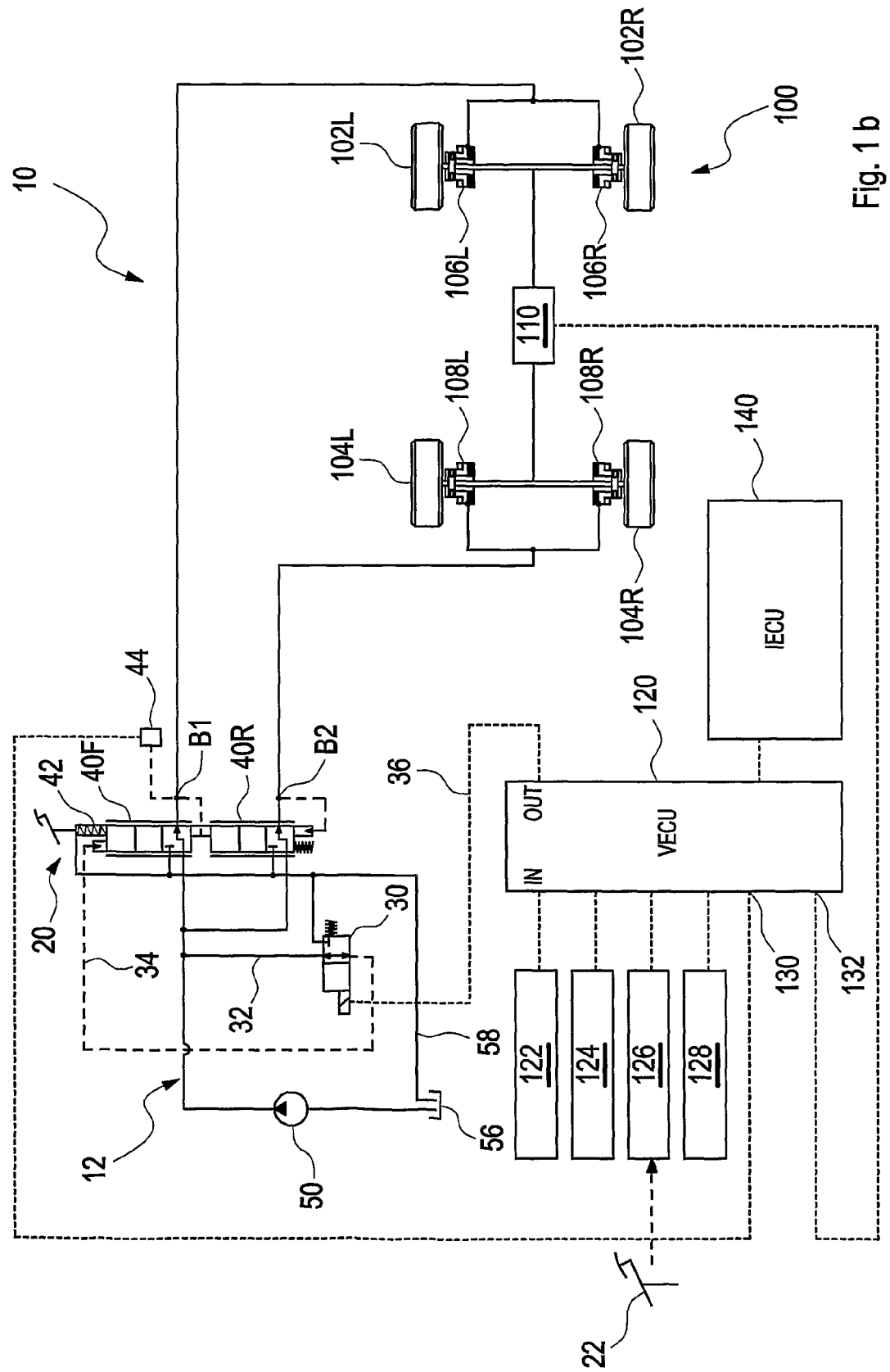

FIGS. 1a and 1b depict an example embodiment of a brake system 10 according to the invention for a work machine 100 comprising an operating brake with an operating brake actuator 20 in a de-energized position (FIG. 1a) and in an energized position (FIG. 1b). A hydraulic circuit 12 is displayed in a simplified manner as hydraulic circuits for brake systems are generally known in the art. In the Figures only the main components of the hydraulic circuit 12 according to the invention are shown.

By way of example, the work machine 100 (shown in an oversimplified manner by wheels with wheel brakes, a gear box 110 and two electronic control units 120, 140) comprises four wheels as ground engagement elements 102L, 102R, 104L, 104R mounted pair-wise at two axles, each ground engagement element 102L, 102R, 104L, 104R equipped with one operating brake 106L, 106R, 108L, 108R acting directly or indirectly on the respective ground engagement element 102L, 102R, 104L, 104R.

The brake system 10 comprises the hydraulic circuit 12 with a hydraulic valve 40F, e.g. a 3/3 way valve, wherein the expression 3/3 is commonly used for a valve with 3 ports and 3 positions, for the operating brakes 106L, 106R acting on the ground engagement elements 102L, 102S on the first axle and a hydraulic valve 4OR, e.g. a 3/3 way valve, for the operating brakes 108L, 108S acting on the ground engagement elements 104L, 104R on the second axle. The two valves 4OF and 40R are coupled (indicated by a solid connection line between the two valves 40F, 40R). The valves 40R, 40F are each hydraulically connected to a respective port B1 and B2, telling that this is a hydraulic way to push on the valve spool, wherein the hydraulic connection of the valve to port B2 is shown for valve 4OR only and indicated for the valve 40F by a dotted line from port B1 to the connection line between the two valves 40R, 40F. A common return spring for both valves 40R, 40F is provided at valve 40R. The valves 4OR, 40F can be operated by pressure from a hydraulic control line 34. Thus, the spool can be balanced: when the spool is "not actuated", the valves 4OR, 40F are drained to tank 56 (through the spool). When the spool is "actuated", a force will act against the brake actuator 20 in a proportional way to the pressure output, which will give a "proper feeling". The more (stroke) the operator pushes, the harder (force) the operator has to push.

The hydraulic valve 40F supplies hydraulic fluid via port B1 to the operating brakes 106L, 106R of the ground engagement elements 102L, 102R on the first axle. The hydraulic valve 40R supplies hydraulic fluid via port B2 to the operating brakes 108L, 108R of the ground engagement elements 104L, 1048 on the second axle.

An actuator device 30, preferably a valve device, embodied by way of example as an electrically activated solenoid valve (3/2 way valve, i.e. a valve with 3 ports and 2 positions) controls the operational state of the hydraulic valves 40F and 40R of the hydraulic circuit 12 which will be described in more detail below.

The actuator device 30 is preferably controlled by a vehicle electronic control unit ("VECU") 120 via a control signal connection 36. The VECU 120 receives inputs from a control lockout lever 122, a selection switch 124 which switches the automatic operating brake mode on or off, an accelerator actuator sensor 126 which is connected to an accelerator actuator 22, e.g. an accelerator pedal, a mode selection switch 128, wherein an operation mode of the work machine 100 can be set to one of various modes, such as a travelling mode, a parking mode, a working mode or a customer mode, as well as at input 130 a brake pressure signal from a brake pressure sensor 44 connected to the hydraulic circuit 12 at port B1 and at input 132 a speed sensor signal from a speed sensor (not shown) which is connected to the gear box 110 of the work machine 100. The control lockout lever 122 is a lever usually arranged at the console of the work machine 100 which has to be activated by the operator when the operator is in the work machine 100. When the operator is out of the work machine 100, the control lockout lever 122 is not engaged and the hydraulic system is compulsorily switched off. The automatic operating brake mode is set if (i) the mode selection switch 128 is switched to one of one or more modes, e.g. a digging mode, which include the automatic operating braking mode, and (ii) the selection switch 124 is set to the automatic operating brake mode.

The actuator valve 30 is controlling the operation of the valves 40F, 40R via the hydraulic control line 34 while the actuator valve 30 itself is electrically controlled via line 36 by the VECU 120.

Only one pressure sensor 44 is needed to sense the pressure in both circuits for the brakes 106L, 106R and 108L, 108R of the front and rear ground engagement elements 102L, 102R and 104L, 104R.

The operating brake actuator 20, e.g. a brake pedal, is mechanically connected to at least one of the 3/3 way valves 40F, 40R of the hydraulic circuit 12. Particularly, the operating brake actuator 20 can be connected to a cylinder of the valve 40F and/or 40R. When pressurized by hydraulic fluid, the respective cylinder for each valve 40F, 40R causes movement of the valve 40F, 40R to the desired position. In the case of a pedal, the operating brake actuator 20 can provide a spool which is in operative connection to a cylinder 42 of at least one of the valves 40F, 40R, wherein the spool is on maximum stroke when the brake pedal (operating brake actuator 20) is pressed down to its engaged position (FIG. 1b). Particularly, the spool can be mechanically connected to one of the cylinders of the valves 40F, 4OL and be automatically moved together with the cylinder concerned.

A pump 50 pumps hydraulic fluid from a hydraulic tank 56 at a low tank pressure of e.g. 2 bar or less to a higher pressure, i.e. the operating pressure, than the tank pressure. Depending on the actual work machine, the higher pressure can be e.g. 65 bar or above. Generally, the higher pressure is a pressure which is the normal operating pressure of the hydraulic brake system 12 for engaging the brakes.

In the de-energized state of the hydraulic valves 4OF, 4OR shown in FIG. 1a the valves 4OF, 40R are in fluid connection with the tank 56 and the hydraulic fluid lines are under low tank pressure. Ports B1 and B2 and the hydraulic control line 34 (via line 58) between the actuator device 30 and the valves 40F, 40R are connected to the tank 56. The actuator device 30, preferably embodied as a solenoid valve, is electrically connected by the signal connection 36 to and controlled by the VECU 120 depending on at least signals of the mode selection switch 128 and the accelerator actuator sensor 126 and the brake pressure provided by the brake pressure sensor 44. This operational state of the actuator device 30—as depicted in FIG. 1a—is the first operational state of the actuator device 30. The operating brake actuator 20 is in its released position and the operating brakes 106L, 106R, 108L, 108R are in their released positions, too. The accelerator actuator 22 can be engaged causing the vehicle to move.

Alternatively it is also possible to connect the actuator device 30 to another hydraulic system, if available, instead of being supplied by the same pump 50 as the brake system itself.

The hydraulic valve 40F supplies hydraulic fluid via port B1 to the operating brakes 106L, 106R of the ground engagement elements 102L, 102S on the first axle. The hydraulic valve 40R supplies hydraulic fluid via port B2 to the operating brakes 108L, 108R of the ground engagement elements 104L, 104R on the second axle. As the hydraulic system 12 in the de-energized state is under tank pressure, the operating brakes 106L, 106R and 108L, 108R are in their released position and the ground engagement elements 102L, 102R and 104L, 104R are not blocked. The operating brake actuator 20 is in its released position.

In the energized state of the solenoid valve (actuator device 30) shown in FIG. 1b, the solenoid valve (actuator device 30) connects the ports B1 and B2 to the high pump pressure of the pump 50 and thereby shifting the hydraulic valves 4OF and 40R accordingly. The pressurized hydraulic fluid causes the operating brakes 106L1 106R and 108L and 108R to engage with the respective ground engagement elements 102L, 102R and 104L1 104R and the work machine 100 is blocked. This operational state of the actuator device 30 corresponds to the second operational state of the actuator device 30, where the operating brake actuator 20 is in its engaged position and the operating brakes 106L, 106R, 108L, 108R are in their engaged position, too, if the automatic brake system is activated. The hydraulic control line 34 (via line 32) between the actuator device 30 and the valves 4OF, 40R are connected to the hydraulic pressure provided by the pump 50.

Simultaneously, the operating brake actuator 20 is automatically moved into its fully engaged position because of the mechanical coupling of the operating brake actuator 20 to the cylinder of at least one of the valves 4OF, 40R. When the operating brake actuator 20 is in its fully engaged position, a retractable latch can optionally be attached to the operating brake actuator 20 to fix the operating brake actuator 20 in its fully engaged position as long as it is supposed to be in this position.

An Instrument Electronic Control Unit (IECU) 140 is coupled to the VECU 120. Preferably, a display can be coupled to the IECU 140. The display provides information to the operator about the selected mode and the status of the operating brakes.

In FIG. 1b for clarity reasons only those parts of the valves 40F, 40R and 30 are depicted in detail which are activated while the other parts of said valves are not depicted in detail. To this end reference is made to FIG. 1 a where these non-activated parts of said valves are depicted in detail, too.

Figure 2:
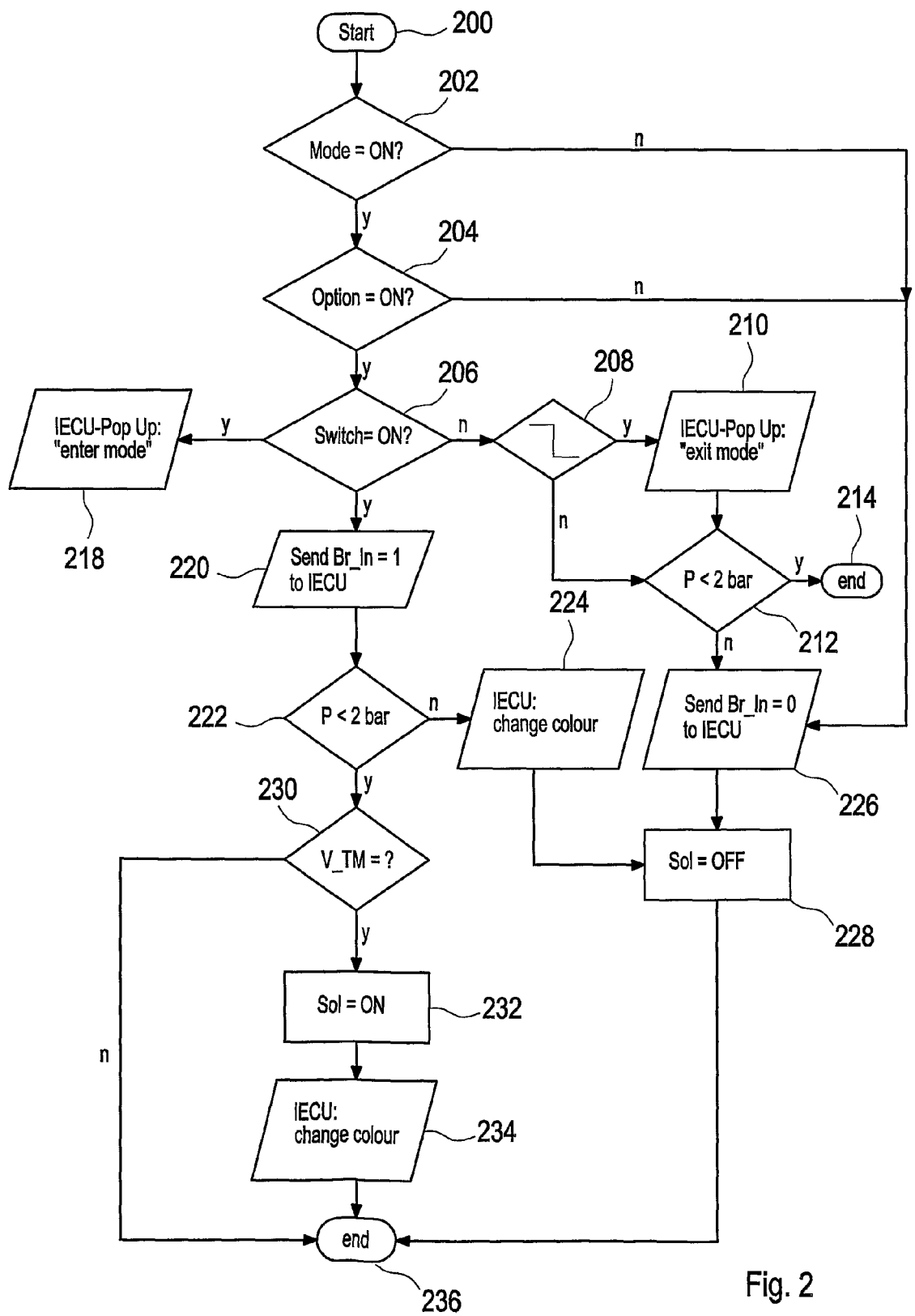
FIG. 2 a flow chart of a main electronic function according to a preferred embodiment of the invention.

FIG. 2 shows a flow chart of the electronic function according to a preferred embodiment of the invention. By way of example, the mode including the automatic operating brake mode (here by way of example called "electric digging brake mode") is a digging mode and the operating brake is a "digging brake" which shall be activated when the work machine stops and the ground engagement elements are securely blocked. The actuator device 30 (FIG. 1a, 1b) is e.g. a solenoid valve which can be controlled by an electric current flowing through the solenoid.

The routine of the main electronic function starts at step 200 when e.g. the work machine is switched on. In step 202 it is checked if the operation mode is ON, wherein, by way of example, two available modes W (working mode) and C (customer mode) can provide the automatic operating brake mode.

If the answer to the check in step 202 is No (indicated by "n" in FIG. 2), the electric digging brake indication BrJn is set to 0 and an information that the electric digging brake indication BrJn is set to 0 is sent to the instrument electronic control unit ("IECU") 140 (see FIG. 1a, 1b) in step 226 and the electric digging brake solenoid signal Sol of the actuator device 30 (FIG. 1a) is set to OFF in step 228. The routine ends in the next step 236.

If the answer to the check in step 202 is Yes (indicated by "y" in FIG. 2), it is checked in step 206 if the electric digging brake switch is ON (activated), i.e. if the automatic digging mode is ON. If the answer is No (indicated by "n" in FIG. 2), in step 208 it is checked if the electrical signal of the switch shows a falling edge, i.e. the automatic digging brake mode has just been switched off. If the answer in step 208 is Yes (indicated by "y" in FIG. 2), the IECU 140 receives data about the status of the automatic digging mode in step 210 and e.g. a pop up in the display of the IECU indicates that the automatic digging brake mode is exited thus disabling the automatic digging brake. In subsequent step 212 it is checked if the pressure p of the accelerator actuator (22 in FIG. 1a, b) is below a pressure threshold, e.g. below 2 bar. If the answer is Yes (indicated by "y" in FIG. 2), the routine stops at step 214. If the answer is No (indicated by "n" in FIG. 2), information that the electric digging brake indication BrJn is set to 0 is sent to IECU 140 (see FIG. 1a, 1b) in step 226 and the electric digging brake solenoid signal Sol of the device 30 (FIG. 1a) is set to OFF in step 228. The routine ends in the next step 236.

If the electric signal of the electric digging brake switch shows no falling edge ("n" in step 208) it is checked in the subsequent step 212 if the pressure p of the accelerator actuator (22 in FIG. 1a, b) is below a low pressure threshold, e.g. below 2 bar. If the answer is Yes (indicated by "y" in FIG. 2), the routine stops at step 214. If the answer is No (indicated by "n" in FIG. 2), information that the electric digging brake indication BrJn is set to 0 is sent to the IECU 140 (FIG. 1a, 1b) in step 226 and the electric digging brake solenoid signal Sol of the actuator device 30 (FIG. 1a) is set to OFF in step 228. The routine ends in the next step 236.

The step 204 between steps 202 and 206 is checking whether an option "automatic digging brake" is installed in the work machine 100 or not. If the option is not installed ("n" in step 204), the routine continues with step 226. If the option is installed ("y" in step 204), the routine continues with step 206.

If in step 206 it is detected that the electric digging brake switch is activated ("y" in step 206), the digging brake indication BrJn is set to 1 and information that the digging brake indication BrJn is set to 1 is sent to the IECU 140 (FIG. 1a, 1b) in step 220. A pop up screen on the display coupled to the IECU 140 can be provided which should appear for some seconds, e.g. 5 seconds, after activating or deactivating the digging brake switch. In step 218 the IECU 140 (FIG. 1a, 1b) activates e.g. a pop up screen in the display to show information like "enter to automatic digging brake mode", in order to inform the operator that the vehicle now enters the automatic digging mode if the electric digging brake switch is activated and a rising edge is detected in the electric signal of the switch.

In step 222 subsequent to step 220, it is checked if the pressure p of the accelerator actuator (22 in FIG. 1a, b) is below a low threshold, e.g. below 2 bar. If the answer is No (indicated by "n" in FIG. 2), in step 224 the IECU 140 (FIG. 1a, 1b) causes the display to change the colour of the digging brake indication BrJn to an indicative colour, e.g. green colour, and the digging brake solenoid Sol is switched OFF in step 228. The indicative colour preferably indicates that the digging mode is selected but the operating brake is not applied. This can happen e.g. when the work machine is travelling and the operating brake is automatically released, i.e. that the work machine is still in its working operation mode (or customer mode) and has to relocate itself from working place A to working place B not far from A within the frame of this mode so that the operator chooses to stay in the digging mode while travelling from A to B. Of course, other colours or other adequate means for conveying this information to the operator can be applied.

If the pressure p of the accelerator actuator (22 in FIG. 1a, b) is below the threshold (indicated by "y" in step 222 in FIG. 2), it is checked in step 230 if the speed signal V_TM of the gear box 110 (FIG. 1a, 1b) indicates that the work machine is standing still or its travelling speed is below a predefined threshold (e.g. below 5 km/h). If the answer is No (indicated by "n" in FIG. 2), the routine ends in step 236. If the answer is Yes (indicated by "y" in FIG. 2), the digging brake solenoid Sol is switched ON in step 232 and the IECU 140 (FIG. 1a, 1b) causes the display to change the colour of the electric digging brake indication BrJn, e.g. yellow colour, signalling to the operator that the automatic operating brake mode is in its operative state. The routine ends at step 236. Of course, other colours or other adequate means for conveying this information to the operator can be applied.

Favourably, the automatic digging brake mode and/or the automatic digging brake is only activated if the hydraulic system is working correctly and enough brake pressure is available. The brake system provides an improved handling comfort for the operator by reducing the necessity to interact directly with the brake system by providing an automatic brake system which does not need interference of the operator to engage or release the operating brake actuator. Operating the work machine is less strenuous and safety is increased as the operator can focus on handling of the work machine.

The invention claimed is:

1. A method for operating a brake system for a work machine, the work machine comprising at least one operating brake acting directly or indirectly on at least one ground engagement element of the work machine and at least one operating brake pedal which is movable between a fully engaged position and a fully released position and an accelerator actuator for activating propulsion of the work machine, comprising
activating the brake system so that the at least one operating brake is engaged and released by a hydraulic pressure in a hydraulic circuit which is controllable by a vehicle electronic control unit, and the at least one operating brake pedal is moved automatically to its fully engaged position when the accelerator actuator is released.

2. The method according to claim 1, comprising, in the activated state of the brake system, moving the at least one operating brake pedal automatically to its fully engaged position only if the work machine is not moving or moving with a speed below a predefined speed threshold.

3. Computer comprising a computer program code adapted to perform a method or for use in a method according to claim 1.

4. Computer program product stored on a non-transitory computer readable medium, comprising a program code for use in a method according to claim 1.

5. A method for operating a brake system for a work machine, the work machine comprising at least one operating brake acting directly or indirectly on at least one ground engagement element of the work machine and at least one operating brake actuator which is movable between a fully engaged position and a fully released position and an accelerator actuator for activating propulsion of the work machine, comprising
activating the brake system so that the at least one operating brake is engaged and released by a hydraulic pressure in a hydraulic circuit which is controllable by a vehicle electronic control unit, and the at least one operating brake actuator is moved automatically to its fully engaged position when the accelerator actuator is released, wherein an actuator device has at least a first operational state and a second operational state, wherein the first operational state corresponds to an engaged position of the accelerator actuator in which the accelerator actuator is engaged and the second operational state corresponds to a released position of the accelerator actuator in which the accelerator actuator is not engaged, wherein the at least one operating brake is connectable by the actuator device to a hydraulic pressure activating the at least one operating brake in order to block the at least one ground engagement element of the work machine in case the at least one operating brake is connected by the actuator device to the hydraulic pressure activating the at least one operating brake.

6. The method according to claim 5, wherein the operating brake actuator is in its fully engaged position if the actuator device is in its second operational state and that the operating brake actuator is moved back to its fully released position if the actuator device is in its first operational state.

7. The method according to claim 5, wherein with the actuator device in its first operational state the at least one operating brake is connected to a hydraulic pressure below the hydraulic pressure activating the at least one operating brake.

8. A method for operating a brake system for a work machine, the work machine comprising at least one operating brake acting directly or indirectly on at least one ground engagement element of the work machine and at least one operating brake actuator which is movable between a fully engaged position and a fully released position and an accelerator actuator for activating propulsion of the work machine,
activating the brake system so that the at least one operating brake is engaged and released by a hydraulic pressure in a hydraulic circuit which is controllable by a vehicle electronic control unit, and the at least one operating brake actuator is moved automatically to its fully engaged position when the accelerator actuator is released, and
mechanically or electromechanically or hydraulically locking the operating brake actuator in its fully engaged position by a retractable latch.

9. A brake system for a work machine, comprising at least one operating brake acting directly or indirectly on at least one ground engagement element of the work machine and at least one operating brake pedal which is movable between a fully engaged position and a fully released position and an accelerator actuator for activating propulsion of the work machine wherein in an activated state of the brake system the at least one operating brake is engaged and released by a hydraulic pressure in a hydraulic circuit which is controllable by a vehicle electronic control unit and an actuator device is provided which in the activated state of the brake system causes an automatic movement of the operating brake pedal to its fully engaged position when the accelerator actuator is released.

10. The brake system according to claim 9, wherein the actuator device in the activated state of the brake system causes the automatic movement of the operating brake pedal to its fully engaged position only if the work machine is not moving or moving with a speed below a predefined speed threshold.

11. The brake system according to claim 9, wherein the actuator device has at least a first operational state and a second operational state, wherein the first operational state corresponds to an engaged position of the accelerator actuator and the second state corresponds to a released position of the accelerator actuator.

12. The brake system according to claim 9, wherein the operating brake pedal is mechanically or electromechanically or hydraulically connected to at least one hydraulic valve operating the at least one operating brake.

13. The brake system according to claim 9, wherein the actuator device in its second operational state connects the at least one operating brake to a hydraulic pressure which activates the at least one operating brake in order to block the at least one ground engagement element of the work machine when the operating brake pedal is in its fully engaged position.

14. The brake system according to claim 9, wherein an actuator element is provided to move the operating brake pedal back to its fully released position if the actuator device is in its first operational state.

15. The brake system according to claim 9, wherein the actuator device in its first operational state connects the at least one operating brake to a hydraulic pressure below the hydraulic pressure activating the at least one operating brake.

16. The brake system according to claim 9, wherein an actuator is provided for selecting one or more modes of the work machine, wherein one mode is the operating mode which activates the brake system.

17. A brake system for a work machine, comprising at least one operating brake acting directly or indirectly on at least one ground engagement element of the work machine and at least one operating brake actuator which is movable between a fully engaged position and a fully released position and an accelerator actuator for activating propulsion of the work machine wherein in an activated state of the brake system the at least one operating brake is engaged and released by a hydraulic pressure in a hydraulic circuit which is controllable by a vehicle electronic control unit and an actuator device is provided which in the activated state of the brake system causes an automatic movement of the operating brake actuator to its fully engaged position when the accelerator actuator is released, wherein a retractable latch is provided which locks the operating brake actuator in the fully engaged position.

18. A brake system for a work machine, comprising at least one operating brake acting directly or indirectly on at least one ground engagement element of the work machine and at least one operating brake actuator which is movable between a fully engaged position and a fully released position and an accelerator actuator for activating propulsion of the work machine wherein in an activated state of the brake system the at least one operating brake is engaged and released by a hydraulic pressure in a hydraulic circuit which is controllable by a vehicle electronic control unit and an actuator device is provided which in the activated state of the brake system causes an automatic movement of the operating brake actuator to its fully engaged position when the accelerator actuator is released, wherein an actuator is provided for selecting one or more modes of the work machine, wherein one mode is the operating mode which activates the brake system, wherein a display is provided which indicates the selected mode.

* * * * *